United States Patent [19]

Soda et al.

[11] 4,431,172

[45] Feb. 14, 1984

[54] DEVICE FOR ABSORBING PUNCHING SHOCK IN A PRESS

[75] Inventors: Choichiro Soda, Abiko; Kazuyoshi Aoi, Ibaragi; Kanichi Hatsukano; Toshio Sano, both of Yatabemachi, all of Japan

[73] Assignees: Agency of Industrial Science & Technology; Ministry of International Trade & Industry, both of Tokyo, Japan

[21] Appl. No.: 289,901

[22] Filed: Aug. 3, 1981

[30] Foreign Application Priority Data

Aug. 6, 1980 [JP] Japan .................. 55-107917

[51] Int. Cl.³ .................... F16F 9/00; F16F 7/08; B21J 7/12; B26D 7/06
[52] U.S. Cl. .................... 267/119; 267/130; 72/433; 83/617; 92/84; 92/85 A; 92/144
[58] Field of Search ............ 267/119, 137, 130, 140.1, 267/124, 113, 116, 8 R; 83/617, 637, 615; 188/264 B, 271; 72/433, 434, 324; 100/220, 258 R; 92/84, 85 A, 144; 403/362, 343, 361; 308/5 V, 6 R, 5 R; 384/321, 317; 248/636, 637, 562; 241/231

[56] References Cited

U.S. PATENT DOCUMENTS

| 722,875 | 3/1903 | Naef | 384/321 |
|---|---|---|---|
| 1,777,130 | 9/1930 | Rode | 267/119 |
| 2,352,911 | 7/1944 | Osplack | 308/6 R |
| 2,744,796 | 5/1956 | Walters | 384/321 |
| 3,030,642 | 4/1962 | Fray | 83/615 |
| 3,108,502 | 10/1963 | Chatfield | 72/433 |
| 3,347,158 | 10/1967 | Peters | 267/119 |
| 3,428,303 | 2/1969 | Lynch | 267/124 |
| 3,490,757 | 1/1970 | Haanes | 267/119 |
| 3,730,039 | 5/1973 | Fedrigo | 83/637 |
| 3,906,552 | 9/1975 | Weber | 403/362 |
| 4,020,929 | 5/1977 | Goldin | 403/362 |
| 4,094,330 | 6/1978 | Jong | 403/362 |
| 4,174,098 | 11/1979 | Baker et al. | 267/130 |
| 4,311,086 | 1/1982 | Schoen | 267/119 |

FOREIGN PATENT DOCUMENTS 1962735 7/1971 Fed. Rep. of Germany ...... 248/562

Primary Examiner—Bruce H. Stoner, Jr.
Assistant Examiner—Robert J. Oberleitner
Attorney, Agent, or Firm—Kurt Kelman

[57] ABSTRACT

A shock absorbing device in a press is formed by having a telescopically sliding member fastened to the punch plate of the press and a stopper member fastened to the die plate of the press and placing an oil of high viscosity between the post and the outer cylinder of the telescopically sliding member. This shock absorbing device damps the unloading impact produced when the punch of the press collides with a workpiece and fractures it and, thereby, abates the noise generated from the press, the tool and the workpiece.

7 Claims, 4 Drawing Figures

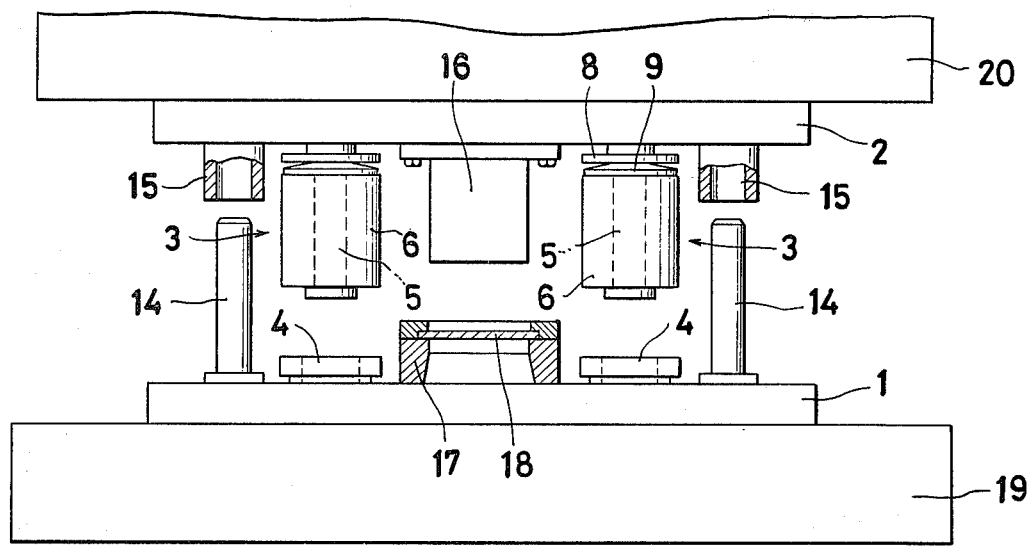
Fig_1
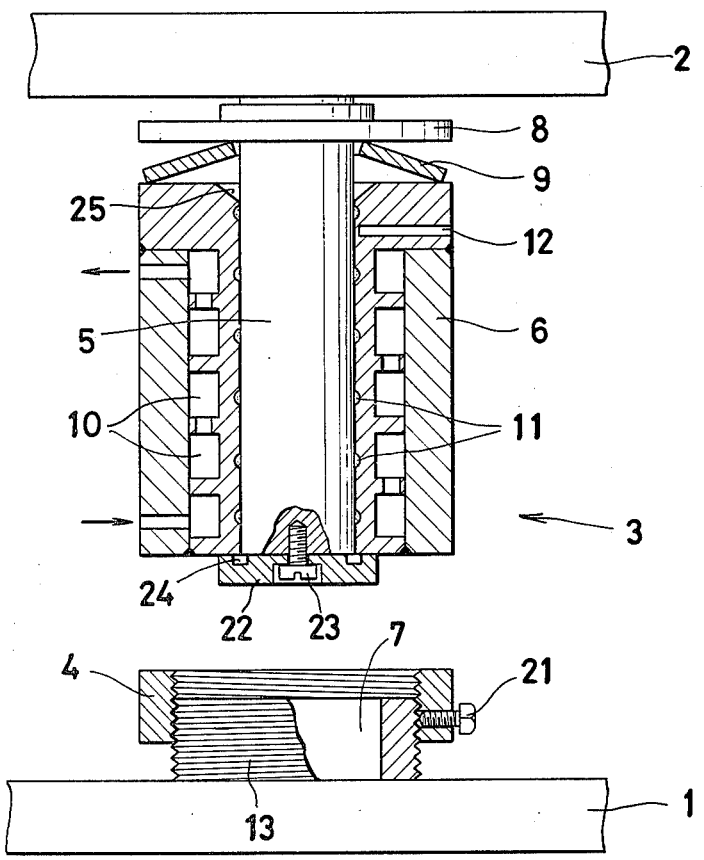
Fig_2

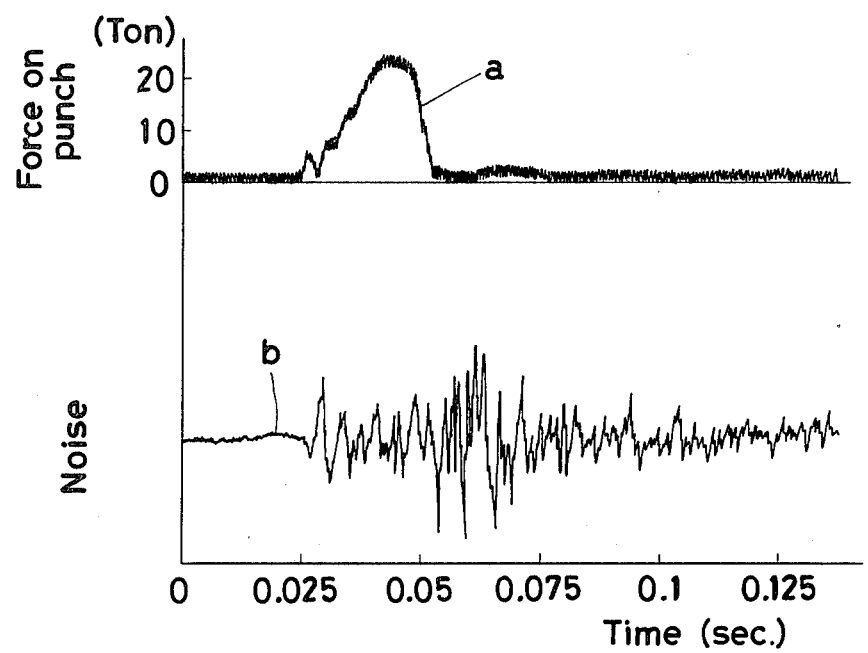
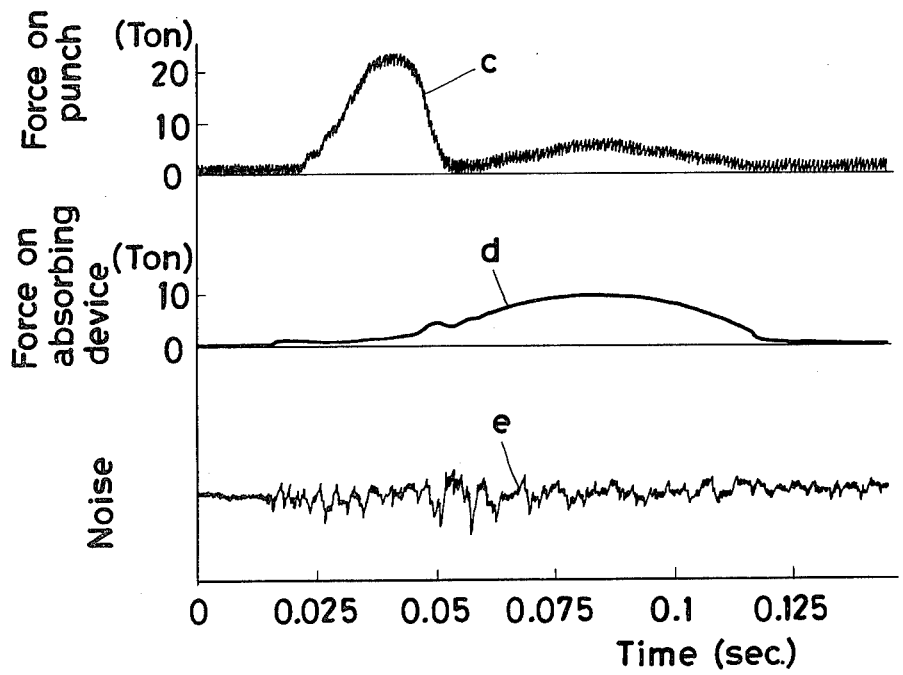

DEVICE FOR ABSORBING PUNCHING SHOCK IN A PRESS

BACKGROUND OF THE INVENTION

This invention relates to a device for absorbing punching shock which occurs during the operation of a press involving the phenomenon of fracture.

In the operation of a press involving the phenomenon of fracture such as shearing, punching or blanking, there generally ensues emission of a very loud noise. To be specific, a noise due to loading impact occurs at the moment the punch collides with the workpiece. Further at the moment the workpiece is fractured, there occurs a very loud noise due to unloading impact. The reason for the emission of this loud noise is as follows. At the moment the lowered punch comes into contact with the workpiece, it begins to exert fairly large pressure to bear thereon. Owing to the consequent reaction, the frame, for example, of the press elastically deforms and accumulates strain energy. The strain energy thus built up within the frame is converted into kinetic energy in the form of vibrations at the very moment the workpiece is finally fractured under the pressure of the punch. These vibrations, upon release into the ambient air, generate the loud noise.

This means that notable abatement of this noise can be accomplished by curbing the sudden fall of the load at the moment of the fracture of the workpiece.

As a device for curbing the sudden fall of the load at the time of the fracture of the workpiece, there has been proposed a shock absorber which utilizes hydraulics (German Patent Offenlegungsschrift No. 23 50 378).

In this shock absorber, a hydraulic cylinder having a piston is provided on a press-bolster and the piston rod protruding upwardly from the hydraulic cylinder is provided on the top thereof with a thread portion which is helically engaged with a nut member. A relief valve is disposed in an oil flow path between the hydraulic cylinder and an oil tank. When a slide is lowered, the punch collides with the workpiece and fractures it and, consequently, the load of the punch is lowered suddenly. At this time, the upper end of the nut member engaged with the piston rod strikes on the press-slide, and the pressure in the hydraulic cylinder is increased to thereby compensate for the sudden fall of the load of the punch and alleviate the shock.

With this shock absorber, however, the hydraulic pressure within the cylinders is prevented from abruptly rising because of the compressibility of the hydraulic oil, leakage, etc. when the workpiece being processed happens to have a small thickness. As a result, this shock absorber has a disadvantage that it fails to provide effective elimination of the unloading impact. It is not easy to surmount this disadvantage.

SUMMARY OF THE INVENTION

An object of this invention is to provide a device for absorbing punching shock in a press, which can be easily adapted to existing presses and which has a simple structure and operates without failure.

To accomplish the object described above according to the present invention, there is provided a device for absorbing punching shock in a press, which device has a sliding member fastened to a punch plate or slide and a stopper member fastened to a die plate or bolster and causes an oil of high viscosity to be present on the sliding surface of the sliding member thereby generating sliding resistance on the sliding surface in proportion to the relative sliding speed, so that the noise generated from the workpiece, tool and press is abated by causing the sliding member to collide with the stopper member to thereby exert buffering effect on the unloading impact which is generated at the time that the punch collides with the workpiece and fractures it. Since the shock absorbing device of this invention comprises a mechanical structure, it can easily be applied to existing presses. Capable of responding to the impact quickly, this shock absorbing device ensures effective abatement of noise not only with workpieces of large thickness but also with workpieces of small thickness.

The other objects and characteristic features of this invention will be described in detail below with reference to the accompanying drawings.

BRIEF DESCRIPTION OF THE DRAWINGS

FIG. 1 is an explanatory diagram illustrating the shock absorbing device of this invention as applied to a known press.

FIG. 2 is a sectional view illustrating one embodiment of the shock absorbing device according to the present invention.

FIG. 3 is a graph showing the relation between the punching force generated between the punch and the die and the magnitude of the noise consequently generated when the press is operated without use of the shock absorbing device of the present invention.

FIG. 4 is a graph showing the relation among the punching force generated between the punch and the die, the force exerted upon the shock absorbing device, and the magnitude of the noise generated when the shock absorbing device of this invention is used in the press.

DETAILED DESCRIPTION OF PREFERRED EMBODIMENT

When the press is operated to shear or perforate a workpiece, much louder noise is emitted at the moment that the punch fractures the workpiece than at the moment that the punch collides with the workpiece as already explained. This is because the strain energy accumulated in the workpiece, the tool and the press is converted into vibrations and released into the ambient air at the moment that the workpiece is fractured. This means that this loud noise can be notably abated by generating resistance in proportion to the rate of change in the distance between the slide and the bolster of the press or between the punch plate and the die plate, thus compensating for the sudden fall of the processing force.

FIG. 1 is an explanatory diagram illustrating the shock absorbing device of this invention as applied to a conventional press. A die plate 1 is provided on the upper surface of a bolster 19 of the press. A punch plate 2 is provided on the lower surface of a slide 20. At the center of the die plate 1 is fastened a die 17. A pair of guide posts 14 are planted one each at the opposite ends of the die plate 1. On the underside of the punch plate 2, a punch 16 is disposed at the position corresponding to the upper end of the die 17 and a pair of guide bushes 15 are disposed at the positions corresponding to the pair of guide posts 14. The slide 20 is vertically moved by the rotary motion of a crank (not shown). As the slide 20 is lowered, the guide bushes 15 are fitted over and slid on the guide posts 14. By the descending motion of the punch 16, the work of shearing or punching is performed on a workpiece 18 mounted on the die 17.

In the press constructed as described above, the shock absorbing device 3 of this invention is disposed between the die plate 1 and the punch plate 2 or between the bolster 19 and the slide 20. The incorporation of the shock absorbing device 3 in the press will be described more specifically with reference to the drawing. A pair of stoppers 4 are provided on the die plate 1 in the spaces intervening between the die 17 and the guide posts 14 disposed at the opposite ends of the die plate 1. From the underside of the punch plate 2 a pair of posts 5 are extended downwardly at the positions corresponding to those of the pair of stoppers 4. A pair of outer cylinders 6 are fitted one each around the posts 5, with an oil of high viscosity interposed therebetween.

The stoppers 4 contain, at their respective centers, holes 7 large enough for the posts 5 to be inserted therein as illustrated in FIG. 2. The stoppers 4 are adapted so that the height of their upper surfaces from the die plate 1 can be adjusted as required. For example, a typical measure adopted for effecting this adjustment comprises screws cut in the inner wall surfaces of the stoppers 4 and matched screw threads formed on the outer surfaces of rings 13 fastened to the die plate 1. With this arrangement, the height of the stoppers relative to the die plate 1 can be adjusted by rotating the stoppers 4 around the rings 13. After the stoppers have been so adjusted to the required height, they can be immobilized on the rings by tightening bolts 21 provided on the lateral walls of the stoppers 4. The stoppers 4 and the rings 13 are both made of steel or a high damping alloy.

To the bases of the posts 5 extended downwardly from the punch plate 2, disc-shaped spring shoes 8 are fixed. Cup springs 9 are interposed one each between the outer cylinders 6 and the spring shoes 8. When the slide is lowered and the outer cylinders 6 are consequently caused to collide with the stoppers 4, the outer cylinders 6 are slid up the posts 5 by overcoming the resistance offered by the oil of high viscosity and the repulsive force generated by the springs 9. Before the slide 2 is lowered in the next cycle of punching work, the outer cylinders 6 must have been returned to their original position. The springs serve the purpose of returning the cylinders to their original position. The springs 9 need not be limited to cup springs. Insofar as the spring force is high enough to fulfil the function described above, coil springs or leaf springs may be used in their place.

The viscosity of the oil of the high viscosity mentioned above changes with temperature. It sharply falls with increasng temperature and, as a result, the sliding resistance which the outer cylinders offer against the posts 5 is affected. Thus, there is a possibility that the desired damping action will not be realized. For this reason, the outer cylinders 6 are internally provided with a path 10 for a coolant. When the ambient temperature rises or the sliding surfaces of the cylinders generate heat of friction, the coolant is passed through the path 10 to prevent the rise of temperature and the fall of viscosity of the oil.

On the surface of the holes formed on the upper surface of the outer cylinders to be penetrated by the posts 5, there are provided converging grooves 25 which serve to facilitate the supply of the oil to the sliding surfaces of the outer cylinders and the guide posts. The sliding surfaces are separated by a gap of 0.01 to 0.02 mm. Further, on the inner walls of the outer cylinders 6, a plurality of grooves 11 are formed. The oil supplied to the sliding surfaces is retained within these grooves 11 so as to ensure safe generation of the sliding resistance. To the lower end surfaces of the posts 5, lids 22 having a slightly larger diameter than the posts are fastened by means of screws 23 for preventing the outer cylinders from slipping off the posts. In the surfaces of these lids 22 which come into contact with the lower end surfaces of the posts, there are formed grooves 24 which prevent the oil on the sliding surfaces from being scattered during the operation of the press. To permit the provision of such lids 22 on the lower end surfaces of the posts, the holes 7 in the stoppers 4 must be given a diameter greater than the diameter of the lids. Optionally, holes 12 may be bored at one portion of the outer cylinders to permit insertion of sensors for measuring the temperature of the sliding surfaces.

As the oil of high viscosity to be interposed between the outer cylinders and the posts for the purpose of this invention, there can be used polybutene-based oil which is supplied as standard liquid for calibrating viscometers. Although the viscosity required of this oil is variable with the total area of the sliding surface and the gap between the post and the outer cylinder generally the oil functions effectively when it has a viscosity capable of greatly repressing the natural vibration of the press, i.e. a viscosity of 50 PaS or higher at 25° C.

The press is provided with the shock absorbing device constructed as described above. Then, the stoppers 4 are adjusted to a height which suits the thickness and material of the workpiece to be sheared or punched. Generally, the noise emitted at the moment that the workpiece is fractured under the pressure of the punch is much louder than that emitted at the moment that the punch collides with the workpiece. Before the operation of the punch, the height of the stoppers is adjusted so that the outer cylinders are allowed to collide with the stoppers between the time the punch collides with the workpiece and the time the workpiece is fractured under the pressure of the punch. Once the height of the stoppers is fixed as described above, the outer cylinders on colliding with the stoppers 4 slide on the posts 5 by overcoming the resistance offered by the oil of high viscosity and the repulsive force generated by the springs 9. Since, in this case, the resistance offered by the oil of high viscosity increases sharply with the sliding speed of the outer cylinders relative to the posts, strong resistance is given to the high-speed sliding of the outer cylinders 6 relative to the posts 5 at the moment that the unloading impact is generated by the fracture of the workpiece. This strong resistance serves the purpose of damping the unloading impact and consequently curbing the emission of loud noise. Particularly at the moment that the outer cylinders collide with the stopper, the outer cylinders are fixed to the posts by the oil of high viscosity and, therefore, it is possible to precisely determine the time for causing the outer cylinders to collide with the stoppers and to produce very large resistance at the same time as the time of the collision.

Sometimes, if not always, owing to the presence of play among the moving parts of the press, the load of the punch is lowered, though momentarily after the punch has collided with the workpiece. This drop of the load of the punch can result in the emission of fairly loud noise. There are also cases where the collision between the punch and the workpiece generates loud noise. In such cases, the noise emitted at the moment of intervenient load drop or the collision of the punch with the workpiece can be effectively abated by adjusting the height of the stoppers so that the outer cylinders collide with the stoppers immediately before the punch collides with the workpiece. It is important to note, however, that loss of energy is suffered when the outer cylinders are allowed to collide with the stoppers too early.

When the slide 2 is about to rise after the workpiece has been sheared or punched by the descent of the slide 2, the outer cylinders 6 are placed in the upper portions of the posts 5. But for the springs 9, they would be prevented from quickly returning to their original position by the resistance from the oil of high viscosity. The springs 9 serve the purpose of causing the outer cylinders 6 to be returned to their original position before they are lowered to collide with the stoppers in the next cycle. The force exerted by these springs is very small in magnitude compared with the magnitude of the sliding resistance offered by the oil of high viscosity. Thus, the springs produce virtually no buffering action.

The embodiment described above represents a case in which the posts are disposed on the punch plate and the stoppers on the die plate. To suit the convenience of the press operation, the posts and the stoppers may be provided directly on the slide and the bolster. The same effect can be obtained by disposing the stoppers on the punch plate or the slide and the posts on the die plate or the bolster.

Optionally, the stoppers may be provided with suitable guide members and thereby allowed to fulfil the function of guide posts, making it possible to obviate the necessity for the guide posts 14 and the guide bushes 15.

By way of example, in a C-type frame press having a stroke of 150 mm, two shock absorbing devices of a construction of FIG. 2 each incorporating a post 60 mm in diameter and an outer cylinder 140 mm in diameter and 150 mm in length were disposed opposite each other across a punch. The gap between the outer cylinders and the posts was 0.01 mm. This gap was filled with a standard liquid for calibrating viscometers JS 200 H (polybutene) made by Showa Oil Company Ltd. Tokyo, Japan, the viscosity of which was 130.0 PaS at 20° C. and 79.8 PaS at 25° C.

To the die of the press described above, a cold rolled steel strip 1.5 mm in thickness was fed to have discs 130 mm in diameter punched out of the steel strip at the rate of 40 strokes per minute with a tool clearance of 0.1 mm. During the punching, the temperature of the sliding surfaces remained at about 25° C.

First the press was operated without using the shock absorbing device. During this operation, the punching force produced between the punch and the die and the acoustic pressure of the generated noise at a distance of 1 m from the punch were measured. The results were as shown in FIG. 3.

FIG. 3 shows that about 0.025 second after the start of the measurement, the punch collided with the workpiece and, about 0.025 second after the collision, the punch fractured the workpiece. The curve "a" represents the load exerted between the punch and the die, and it indicates that the load increased to about 5 tons upon the collision of the punch with the workpiece, then fell momentarily, and again increased to about 25 tons, bringing the fracture of the workpiece to completion. The noise represented by the curve "b" reached the highest value 92 dB (IA) immediately after the fracture of the workpiece. A fairly loud noise was generated when the load temporarily fell after the collision of the punch with the workpiece.

Then, the height of the stoppers of the shock absorbing device was adjusted so that the stoppers would collide with the outer cylinders immediately before the collision of the punch with the workpiece. Under the same conditions a described above, the punching work was performed with the press. During the operation, the punching force produced between the punch and the die, the force exerted on the outer cylinders and the stopper, and the acoustic pressure of the noise generated at that time were measured. The results were as shown in FIG. 4.

By the time that the punch collided with the workpiece, the outer cylinders had already collided with the stoppers to produce a shock absorbing action. The curve "c" representing the load shows that there appeared no temporary fall of the load of the punch immediately after the collision of the punch with the workpiece. The fracture of the workpiece was effected with the load of about 25 tons.

The curve "d" which represents the force exerted between one of the pair of stoppers and the corresponding outer cylinder shows that this force was 1 to 2 tons until immediately before the workpiece was fractured, suddenly increased to reach about 5 tons when the workpiece was fractured, slightly fell subsequently, again increased gradually to reach the highest level (about 10 tons) about 0.03 second after the fracture, and thereafter decreased gradually. Once this period of fracturing ended, a load of about 5 tons was exerted on the punch.

The curve "e" which represents the acoustic pressure of generated noise shows that the noise reached the highest level of 80 dB (IA) immediately after the fracture of the workpiece. This value is notably lower than the level of the noise generated when the press was operated without using the shock absorbing device of this invention. This act indicates that the shock absorbing devices of this invention are effective in abating noise in the operation of the press.

As described in detail above, differently from conventional shock absorbers which utilize hydraulics, the shock absorbing devices of the present invention make use of the phenomenon that the oil of high viscosity placed between the posts and the outer cylinders offers sliding resistance in proportion to the speed of the sliding motion and, therefore, absorb the unloading impact of the pressure effectively without failure. Moreover, the shock absorbing devices of this invention which have a simple structure, provide effective abatement of the noise of the press.

What is claimed is:

1. A device for absorbing punching shock in a press assembly including a punch extending downwardly from a slide and a die disposed on a bolster cooperating with said punch to shear a workpiece, said device comprising:
   (a) a post extending downwardly from said slide;
   (b) an outer cylinder slidably mounted on said post and having a gap between the sliding surfaces of said cylinder and said post, said outer cylinder having a length less than the length of said post;
   (c) oil having a high viscosity of about 50 PaS at 25° C. disposed in the gap between the sliding surfaces of said outer cylinder and said post for impeding the sliding movement therebetween;

(d) biasing means for biasing said outer cylinder toward the bottom end of said post;

(e) an annular stopper on said bolster adapted to accept said post therein upon the downward stroke of said slide and to engage said outer cylinder prior to the shearing of said workpiece by said punch; and (f) means for adjusting the height of said annular stopper.

2. The shock absorbing device according to claim 1, wherein the means for adjusting the height of said annular stopper comprises a ring member fastened to the bolster and possessing a male screw on the outer surface thereof and a stopper member possessing a female screw on the inner surface so as to be screw-fitted on said ring member, whereby the height of the stopper member is adjusted by the rotation of the stopper relative to the ring member.

3. The shock absorbing device according to claim 1, wherein the gap between the post and the outer cylinder is in the range of from 0.01 to 0.02 mm.

4. The shock absorbing device according to claim 1, which further comprises a lid provided at the lower end surface of the post and adapted to keep the outer cylinder from falling and prevent the oil of high viscosity from escaping.

5. The shock absorbing device according to claim 1, wherein the outer cylinder is provided with a path for the flow of coolant serving to cool the inner surface of the outer cylinder.

6. The device for absorbing shock in a press assembly according to claim 1, wherein two such devices are utilized on the press assembly disposed on opposite sides of said punch.

7. The device for absorbing shock in a press assembly according to claim 1, which further includes annular grooves on the inner surface of said outer cylinder for retaining said oil.

* * * * *